(12) United States Patent
Hu et al.

(10) Patent No.: US 11,544,751 B2
(45) Date of Patent: Jan. 3, 2023

(54) QUOTATION METHOD EXECUTED BY COMPUTER, QUOTATION DEVICE, ELECTRONIC DEVICE AND STORAGE MEDIUM

(71) Applicant: BOE TECHNOLOGY GROUP CO., LTD., Beijing (CN)

(72) Inventors: Zhenggang Hu, Beijing (CN); Jian Hou, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 371 days.

(21) Appl. No.: 16/633,214

(22) PCT Filed: Jun. 13, 2019

(86) PCT No.: PCT/CN2019/091122
§ 371 (c)(1),
(2) Date: Jan. 23, 2020

(87) PCT Pub. No.: WO2020/007177
PCT Pub. Date: Jan. 9, 2020

(65) Prior Publication Data
US 2020/0193491 A1    Jun. 18, 2020

(30) Foreign Application Priority Data

Jul. 5, 2018    (CN) .......................... 201810731140.4

(51) Int. Cl.
*G06Q 30/02*    (2012.01)
*G06K 9/62*    (2022.01)
(Continued)

(52) U.S. Cl.
CPC ......... *G06Q 30/0283* (2013.01); *G06K 9/623* (2013.01); *G06K 9/6215* (2013.01);
(Continued)

(58) Field of Classification Search
CPC .......... G06Q 30/0283; G06Q 10/0875; G06K 9/6215; G06K 9/6256; G06K 9/6267; G06V 10/20; G06V 10/40
(Continued)

(56) References Cited

U.S. PATENT DOCUMENTS

2016/0117398 A1    4/2016    Dakua
2020/0193491 A1    6/2020    Hu et al.

FOREIGN PATENT DOCUMENTS

CN    1661606 A  *  8/2005
CN    1661606 A     8/2005
(Continued)

OTHER PUBLICATIONS

International Search Report of PCT/CN2019/091122 in Chinese, dated Sep. 18, 2019, with English translation.
(Continued)

*Primary Examiner* — Ariel J Yu
*Assistant Examiner* — Denisse Y Ortiz Roman
(74) *Attorney, Agent, or Firm* — Collard & Roe, P.C.

(57) ABSTRACT

Disclosed is a quotation method executed by a computer, comprising: obtaining structure parameters and electrical parameters of a product (S101); constructing an external view of the product by using the structure parameters of the product, and performing similarity comparison on the external view of the product and the external view of a historical product to obtain an appearance similarity sorting (102); performing similarity comparison on the electrical parameters of the product and the electrical parameters of the historical product to obtain an electrical parameter similarity sorting (103); on the basis of the cost weights of a structural member and an electrical component and the appearance similarity sorting and the electrical parameter similarity sorting, obtaining a comprehensive sorting which is based
(Continued)

on the structure parameters and the electrical parameters (S104); and determining, based on the comprehensive sorting, a bill of materials of the product, and calculating, based on the bill of the materials of the product, the product quotation (105).

12 Claims, 6 Drawing Sheets

(51) Int. Cl.
  *G06Q 10/08* (2012.01)
  *G06V 10/20* (2022.01)
  *G06V 10/40* (2022.01)
(52) U.S. Cl.
  CPC ......... *G06K 9/6256* (2013.01); *G06K 9/6267* (2013.01); *G06Q 10/0875* (2013.01); *G06V 10/20* (2022.01); *G06V 10/40* (2022.01)
(58) Field of Classification Search
  USPC .......................................................... 705/29
  See application file for complete search history.

(56) References Cited

FOREIGN PATENT DOCUMENTS

| | | | |
|---|---|---|---|
| CN | 103246950 A | | 8/2013 |
| CN | 105956875 A | | 9/2016 |
| CN | 106126755 A | * | 11/2016 |
| CN | 106126755 A | | 11/2016 |
| CN | 107077500 A | | 8/2017 |
| CN | 108182606 A | | 6/2018 |
| CN | 108198072 A | | 6/2018 |
| CN | 109064253 A | | 12/2018 |
| WO | 2014/055907 A1 | | 4/2014 |

OTHER PUBLICATIONS

Chinese Office Action in Chinese Application No. 201810731140.4 dated Jun. 2, 2021, with English translation.
Extended European Search Report dated Feb. 14, 2022 in European Patent Application No. 19830747.2.
Wikipedia: "Image noise", Internet Article, Jan. 19, 2018 (Jan. 19, 2018), XP055886973, Retrieved from the Internet: URL:https://en.wikipedia.org/w/index.php?title=Image_noise&oldid=821304261 [retrieved on Feb. 3, 2022].

* cited by examiner

QUOTATION METHOD EXECUTED BY COMPUTER, QUOTATION DEVICE, ELECTRONIC DEVICE AND STORAGE MEDIUM

CROSS REFERENCE TO RELATED APPLICATIONS

This application is the National Stage of PCT/CN2019/091122 filed on Jun. 13, 2019, which claims priority under 35 U.S.C. § 119 of Chinese Application No. 201810731140.4 filed on Jul. 5, 2018, the disclosure of which is incorporated by reference.

TECHNICAL FIELD

The present disclosure relates to a technical field regarding determining product price, and particularly to a computer-implemented, an apparatus, an electronic device, and a storage medium for determining product price.

BACKGROUND

At present, a general process for determining the price of B2B products (such as display products) is: at first, a customer puts forward requirements for appearance and electrical specifications of a product, and then a company's business personnel draws appearance pictures of the product with software tools according to the appearance and specifications of the product by analyzing the customer's requirements and confirming feasibility with research personnel. Finally, the business personnel, collaborated with the research personnel, select a similar historical product based on experience, calculate its BOM (Bill of Material) cost, and add other factors that affect the cost to determine the price for the product. However, the current method for determining product price not only depends too much on R&D engineers, but also is difficult to traverse all historical products by using such a selection manner, resulting in an excessively long determining cycle and causing inevitably an inaccurate product price.

SUMMARY

According to one aspect of the present disclosure, there is provided a computer-implemented method for determining product price, comprising: acquiring structural parameters and electrical parameters of a product; constructing appearance picture of the product with the structural parameters of the product, and comparing similarities between the appearance picture of the product and appearance pictures of historical products to obtain an appearance similarity ranking; comparing similarities between the electrical parameters of the product and electrical parameters of the historical products to obtain an electrical-parameter similarity ranking; obtaining a comprehensive ranking with respect to the structural parameters and the electrical parameters based on cost weights of structural components and electrical elements, the appearance similarity ranking and the electrical-parameter similarity ranking; and determining a bill of materials for the product based on the comprehensive ranking, and calculating a price for the product based on the bill of materials for the product.

According to an embodiment of the present disclosure, the comparing similarities between the appearance picture of the product and appearance pictures of historical products to obtain an appearance similarity ranking comprises: detecting the appearance picture of the product to extract structural features in the appearance picture of the product; ranking, with a classifier, similarities between structural features in the appearance pictures of the historical products and the structural features in the appearance picture of the product to obtain the appearance similarity ranking.

According to an embodiment of the present disclosure, the method further comprises: performing signal transformation and noise reduction pre-processing on the appearance picture of the product.

According to an embodiment of the present disclosure, the detecting the appearance picture of the product comprises: moving a scanning sub-window in the appearance picture of the product; calculating, for each position in the appearance picture of the product determined during the movement of the scanning sub-window, structural features of the position.

According to an embodiment of the present disclosure, the ranking, with a classifier, similarities between structural features in the appearance pictures of the historical products and the structural features in the appearance picture of the product comprises: ranking, with the classifier, the similarities between the structural features in the appearance pictures of the historical products and the structural features in the appearance picture of the product based on a recursive feature elimination algorithm.

According to an embodiment of the present disclosure, the ranking the similarities between the structural features in the appearance pictures of the historical products and the structural features in the appearance picture of the product based on a recursive feature elimination algorithm comprises: converting parameter values corresponding to the structural features into coordinate values to obtain an initial feature permutation; calculating a weight corresponding to each structural feature by $$w = \sum_{i=1}^{m} \alpha_i y_i x_i,$$

wherein w is a weight corresponding to a structural feature, m is a total number of historical products having the structural feature, $\alpha_i$ is a weight ratio, and $(x_i, y_i)$ is a coordinate value used to represent the structural feature of the picture; calculating an permutation score corresponding to each structural feature based on the weight corresponding to each structural feature by $c_j=(w_j)^2$ wherein $w_j$ is a weight corresponding to the j-th structural feature, and $c_j$ is a permutation score corresponding to the j-th structural feature; removing a feature with the smallest permutation score in the initial feature permutation, and updating the initial feature permutation to obtain a new feature permutation; repeating a loop of above steps until only one feature is included in the new feature permutation, and obtaining a similarity ranking of the structural features based on an order of features being removed.

According to an embodiment of the present disclosure, the method further comprises: training the classifier based on a knowledge base or restrictive conditions by using training sample data, wherein the training sample data includes positive samples and negative samples, the positive samples are samples containing structural features to be detected, and the negative samples are samples containing no structural features to be detected.

According to an embodiment of the present disclosure, the appearance picture comprises shape, size, material and appearance design parameters of the product, and the appearance picture is a six-view picture of the product drawn at a same scale.

According to an embodiment of the present disclosure, the comparing similarities between the electrical parameters of the product and electrical parameters of the historical products to obtain an electrical-parameter similarity ranking includes: determining numbers of same electrical parameters that the historical products have as the product; ranking the historical products based on the numbers of the same electrical parameters.

According to an embodiment of the present disclosure, the obtaining a comprehensive ranking with respect to the structural parameters and the electrical parameters based on cost weights of structural components and electrical elements, the appearance similarity ranking and the electrical-parameter similarity ranking comprises: determining weights of the appearance similarity ranking and the electrical-parameter similarity ranking based on cost weights of the structural components and the electrical elements; calculating the comprehensive ranking with respect to the structural parameters and the electrical parameters based on the weights of the appearance similarity ranking and the electrical-parameter similarity ranking.

According to an embodiment of the present disclosure, the determining a bill of materials for the product further comprises: adjusting the bill of materials for the product based on the structural parameters and the electrical parameters of the product, to obtain a bill of materials for the product satisfying the structural parameters and the electrical parameters of the product.

According to an embodiment of the present disclosure, the price for the product is calculated by the following formula:

Product price=Σ(cost of parts)×processing rate×other rates, wherein, the cost of parts is calculated based on the bill of materials for the product, and the processing rate and other rates are obtained from an enterprise resource planning system.

According to other aspect of the present disclosure, there is provided an apparatus for determining product price, comprising: a parameter acquiring unit configured to acquire structural parameters and electrical parameters of a product; an appearance similarity ranking unit configured to construct appearance picture of the product by using the structural parameters of the product, and compare similarities between the appearance picture of the product and appearance pictures of historical products to obtain an appearance similarity ranking; an electrical-parameter similarity ranking unit configured to compare similarities between the electrical parameters of the product and electrical parameters of the historical products to obtain an electrical-parameter similarity ranking; a comprehensive ranking unit configured to obtain a comprehensive ranking with respect to the structural parameters and the electrical parameters based on cost weights of structural components and electrical elements, the appearance similarity ranking and the electrical-parameter similarity ranking; and a product price determining unit configured to determine a bill of materials for the product based on the comprehensive ranking, and calculate a price for the product based on the bill of materials for the product.

According to other aspect of the present disclosure, there is provided an electronic device, comprising: at least one processor; and a memory communicatively connected to the at least one processor, wherein the memory stores instructions executable by the at least one processor, which enable the at least one processor to execute the computer-implemented method for determining product price mentioned above.

According to other aspect of the present disclosure, there is provided a computer-readable storage medium having stored thereon instructions that, when executed by a processor, cause the processor to execute the computer-implemented method for determining product price mentioned above.

DETAILED DESCRIPTION

In order to make objectives, technical solutions, and advantages of the present invention more apparent, the present invention is further described in detail below with reference to the accompanying drawings in conjunction with specific embodiments.

It should be noted that all expressions using "first" and "second" in the embodiments of the present disclosure are intended to distinguish two different entities or different parameters having a same name, thus it can be seen that "first" and "second" are only for convenience of expression and should not be construed as a limitation to the embodiments of the present disclosure, which will not be explained one by one in subsequent embodiments.

An objective of the present invention is to provide a computer-implemented method, an apparatus and an electronic device for determining product price, which can implement determine product price quickly and accurately, to significantly reduce dependence of determining product price on R&D engineers, and to reduce labor and material costs of product price.

Figure 1A:
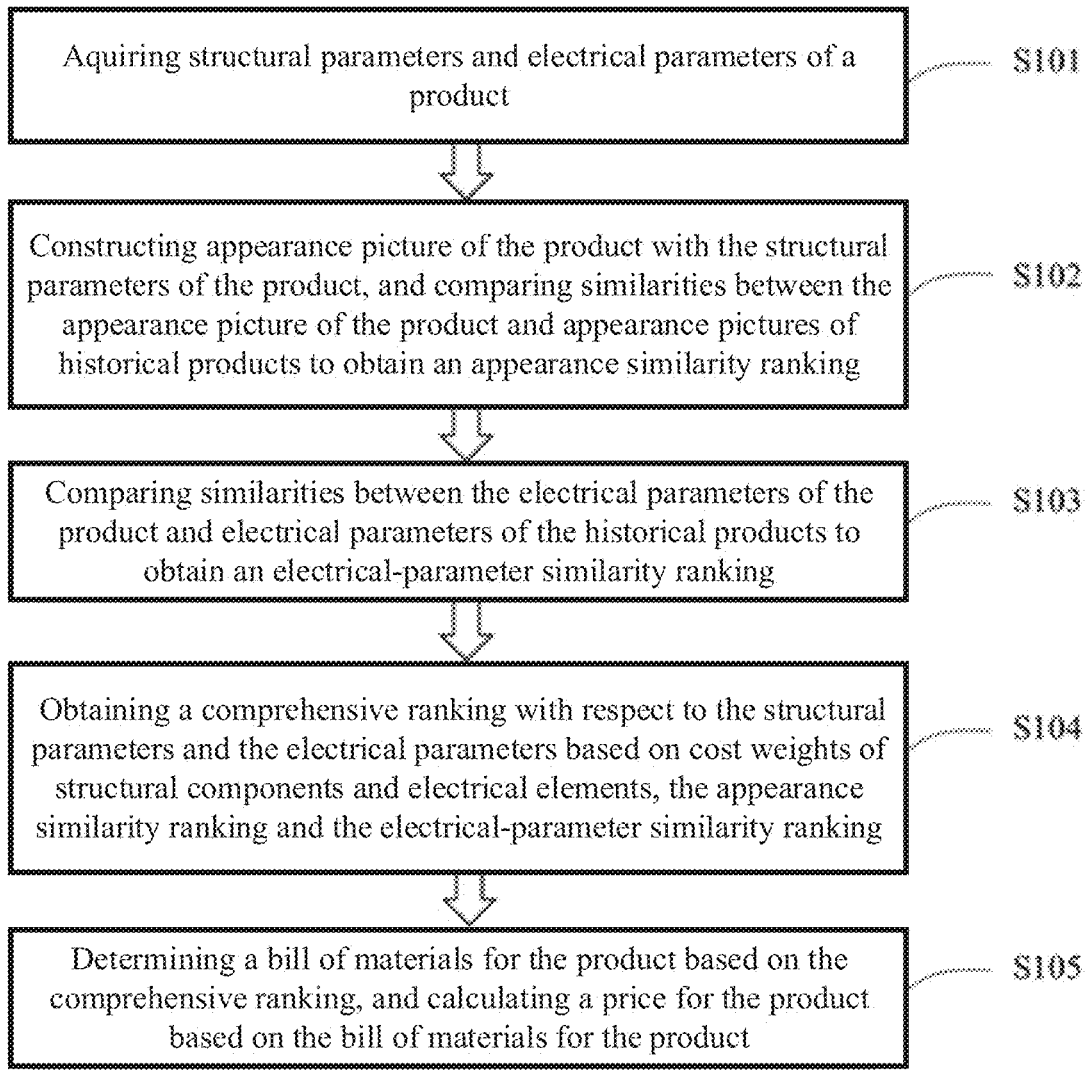
FIG. 1A is a schematic flowchart of a computer-implemented method for determining product price according to an embodiment of the present disclosure.

FIG. 1A illustrates a schematic flowchart of a computer-implemented method for determining product price according to an embodiment of the present disclosure. The method for determining product price can be used to carry out the process for determining the product price. The product may be, for example, a new product that needs to determine the price of it. According to the method for determining product price of the present disclosure, a computer can automatically calculate a price for a product by combining structural parameters and electrical parameters of the product (i.e., the new product) together with parameters of historical products, thereby improving the rate and accuracy of the process of determining, as well as avoiding labor and material consumption of determining the product price manually.

First, at step S101, the structural parameters and the electrical parameters of the product are acquired. For example, the structural parameters and the electrical parameters corresponding to the product may be acquired based on the customer's requirements for the product. The structural parameters refer to parameters related to structural design of the product. For example, taking a television product as an example, the structural parameters may be divided into a plurality of primary materials, such as a front frame, a screen, a rear case, a button, a bracket, and a base, and attribute parameters related to each primary material, such as shape, size, material, appearance, etc. The electrical parameters are parameters related to electrical design of the product. For example, taking the product being a display product as an example, the electrical parameters may include key technologies, hardness, brightness, board power, size, etc. of a liquid crystal panel of the display product. In addition, for some products, there may be some parameters that are neither the structural parameters nor the electrical parameters, or have characteristics of both the structural parameters and the electrical parameters, which, at this time, may be classified into one of the structural parameters or the electrical parameters in advance to achieve a unified division. As an example, the acquiring process may correspond to a user inputting the structural parameters and the electrical parameters to a processor, such as a computer, through an input device. After receiving the parameters, the computer may for example store the parameters in a local or cloud memory. Alternatively, the computer may also acquire the parameters through a wireless device based on a wireless network.

Next, at step S102, an appearance picture of the product is constructed by using the structural parameters of the product, and an appearance similarity ranking is obtained by comparing similarities between the appearance picture of the product and appearance pictures of the historical products respectively. For example, the computer may generate the appearance picture of the product by using drawing software installed therein based on the structural parameters of the product. The appearance pictures of the historical products may be stored, for example, in a database accessible by the computer. Wherein, an appearance picture of a product is used to reflect an overall performance of the product's size, external structure, color, pattern, shape, etc., and may be used to reflect quality of the product. According to an embodiment of the present disclosure, the appearance picture constructed by using the structural parameters of the product may be six views of the product drawn at a same scale, such that the appearance picture may intuitively embody the structural parameters of the product, such as shape, size, material, and appearance design. According to other embodiments of the present disclosure, the appearance picture constructed by using the structural parameters of the product may also be a three-dimensional stereoscopic structure diagram for stereoscopically displaying the structural parameters of the product such as shape, size, material, and appearance design. The appearance similarity ranking is used to reflect a degree of similarity between the historical products and the product in appearance, and the appearance may be reflected by the structural features.

According to an embodiment of the present disclosure, before detection of the appearance pictures of the product, signal transformation and noise reduction pre-processing may be performed on the appearance picture of the product to remove impurities and interference factors in signals, thereby improving accuracy of subsequent recognition. For example, the signal transformation may include converting image signals of the appearance picture into electrical signals.

According to an embodiment of the present disclosure, comparing similarities between the appearance picture of the product and the appearance pictures of the historical products respectively to obtain the appearance similarity ranking may include detecting the appearance pictures of the product to extract the structural features in the appearance picture of the product, where detecting the appearance picture of the product includes: moving a scanning sub-window in the appearance pictures of the product; calculating, for each position in the appearance pictures of the product determined during the movement of the scanning sub-window, structural features of the position. According to an embodiment of the present disclosure, comparing similarities between the appearance picture of the product and the appearance pictures of the historical products to obtain the appearance similarity ranking may further include: ranking, with a classifier, similarities between structural features of the appearance pictures of the historical products and the structural features of the appearance picture of the product to obtain the appearance similarity ranking. According to an embodiment of the present disclosure, similarities between the structural features of the appearance pictures of the historical products and the structural features of the appearance picture of the product may be ranked, with the classifier, based on a recursive feature elimination algorithm.

According to an embodiment of the present disclosure, ranking the similarities between the structural features of the appearance pictures of the historical products and the structural features of the appearance picture of the product based on the recursive feature elimination algorithm may include the following steps: converting parameter values corresponding to the structural features into coordinate values to obtain an initial feature permutation; calculating a weight corresponding to each structural feature, wherein a weight is calculated by $$w = \sum_{i=1}^{m} \alpha_i y_i x_i,$$

where w is a weight corresponding to a structural feature, m is a total number of historical products having the structural feature, $\alpha_i$ is a weight ratio, and $(x_i, y_i)$ is a coordinate value used to represent the structural feature of the pictures; calculating an permutation score corresponding to each structural feature based on the weight corresponding to each structural feature by $c_j = (w_j)^2$, where $w_j$ is a weight corresponding to the j-th structural feature and $c_j$ is a permutation score corresponding to the j-th structural feature; removing a structural feature with the smallest permutation score in the initial feature permutation, and updating and obtaining a new feature permutation; repeating the loop of the above steps until only one structural feature is included in the new feature permutation, and obtaining a similarity ranking of the structural features based on an order of structural features being removed.

According to an embodiment of the present disclosure, the computer-implemented method for determining product price may further train the classifier which includes training the classifier based on a knowledge base or restrictive conditions by using training sample data, where the training sample data include positive samples and negative samples, the positive samples are samples containing structural features to be detected, and the negative samples are samples containing no structural features to be detected.

As shown in FIG. 1A, next, at step S103, similarities between the electrical parameters of the product and electrical parameters of the historical products are compared to obtain an electrical-parameter similarity ranking. Among them, the appearance similarity ranking obtained based on the comparison of the product's appearance picture with the historical products' appearance pictures respectively involves structural features of mechanical parts of the product. In addition, key factors affecting the product cost further include liquid crystal panels, internal circuit devices and the like. Based on these features, a list of electrical parameters corresponding to the product may be established for comparing similarities between the electrical parameters of the product and the electrical parameters of the historical products, to obtain the electrical-parameter similarity ranking. The electrical-parameter similarity ranking is used to reflect a degree of similarity between a historical product and the product in electrical parameters, and the higher of the ranking, the closer the historical product is to the product in terms of the electrical parameters.

According to an embodiment of the present disclosure, first, numbers of same electrical parameters that the historical products have as the product are determined, and then the historical products are ranked based on the numbers of the same electrical parameters. As an example, the product may include, for example, 10 electrical parameters, and, it determines, by comparison (for example, based on the list), a historical product 1 has 8 electrical parameters that are the same as the electrical parameters of the product, a historical product 2 has 6 electrical parameters that are the same as the electrical parameters of the product, and a historical product 3 has 5 electrical parameters that are the same as the electrical parameters of the product, and thus the historical products may be ranked based on the numbers of the same electrical parameters, resulting in a ranking that may be, for example, the historical product 1, the historical product 2, and the historical product 3.

As shown in FIG. 1A, next, at step S104, a comprehensive ranking based on the structural parameters and the electrical parameters is obtained based on cost weights of structural components and electrical elements, the appearance similarity ranking, and the electrical-parameter similarity ranking. After the appearance similarity ranking and the electrical-parameter similarity ranking, a comprehensive ranking needs to be performed based on the appearance similarity ranking and the electrical-parameter similarity ranking, that is, the appearance similarity and the electrical-parameter similarity of the historical products with the product are comprehensively considered to obtain the comprehensive ranking based on the structural parameters and the electrical parameters. The comprehensive ranking based on the structural parameters and the electrical parameters may be calculated according to the cost weights of the structural components (i.e., mechanical parts) and the electrical elements.

According to the embodiments of the present disclosure, weights of the appearance similarity ranking and the electrical parameter similarity ranking may be determined based on the cost weights of the structural components and electrical elements, and the comprehensive ranking based on the structural parameters and the electrical parameters may be calculated based on the weights of the appearance similarity ranking and the electrical parameter similarity ranking. The weights of the appearance similarity ranking and the electrical-parameter similarity ranking may be determined with the cost weights by determining an average value of structural components and electrical elements corresponding to a plurality of historical products ranked in front in the appearance similarity ranking and the electrical-parameter similarity. And then, the comprehensive ranking based on the structural parameters and the electrical parameters is obtained.

As shown in FIG. 1A, at step S105, a bill of materials for the product is determined based on the comprehensive ranking, and a price for the product is calculated based on the bill of materials for the product. The bill of materials (BOM) of the product refers to a detail list and structures of parts required for the product. As an example, based on the comprehensive ranking, a bill of materials for the highest ranked historical product may be used as the bill of materials for the product. For the historical product, its bill of materials may be stored in a computer-accessible database along with, such as, electrical parameters and structural parameters of the historical product. After the highest ranked historical product is determined, the computer may directly access the database and extract the bill of materials for the historical product. The bill of materials is a bill of all sub-assemblies, parts, and raw materials constituting an assembly, and is also a bill of quantities of each part required to manufacture an assembly. In addition, the bill of materials may also be associated with unit-prices of respective parts of the product. A price for the product is then calculated based on the product's bill of materials. For example, the price for the product is determined based on the quantities and the unit-prices of respective of parts included in the product's bill of materials.

According to an embodiment of the present disclosure, determining the bill of materials for the product may further include: adjusting the bill of materials for the product based on the structural parameters and the electrical parameters of the product to obtain a bill of materials for the product satisfying the structural parameters and the electrical parameters of the product. That is, if the obtained bill of materials for the product still cannot fully satisfy all the parameter requirements of the product, accordingly, a certain degree of modification, addition or deletion to the bill of materials is required to enable parts in the bill of materials to fully satisfy the product's requirements for the structural parameters and the electrical parameters. Then, the price for the product may be determined based on the adjusted bill of materials for the product.

According to an embodiment of the present disclosure, the price for the product is calculated by the following formula:

$$\text{Product price} = \Sigma(\text{cost of parts}) \times \text{processing rate} \times \text{other rates},$$

wherein, the cost of parts is calculated based on the bill of materials for the product, and the processing rate and other rates are obtained from an enterprise resource planning system.

For example, the processing rate may include equipment loss, processing cycle, and the like, such as machine tonnage, machine expenses/hour, and product molding cycle. The other rates may include management expenses, transportation expenses, packaging expenses, and so on. And the processing rate and other rates are generally available in the enterprise resource planning system (ERP).

Figure 1B:
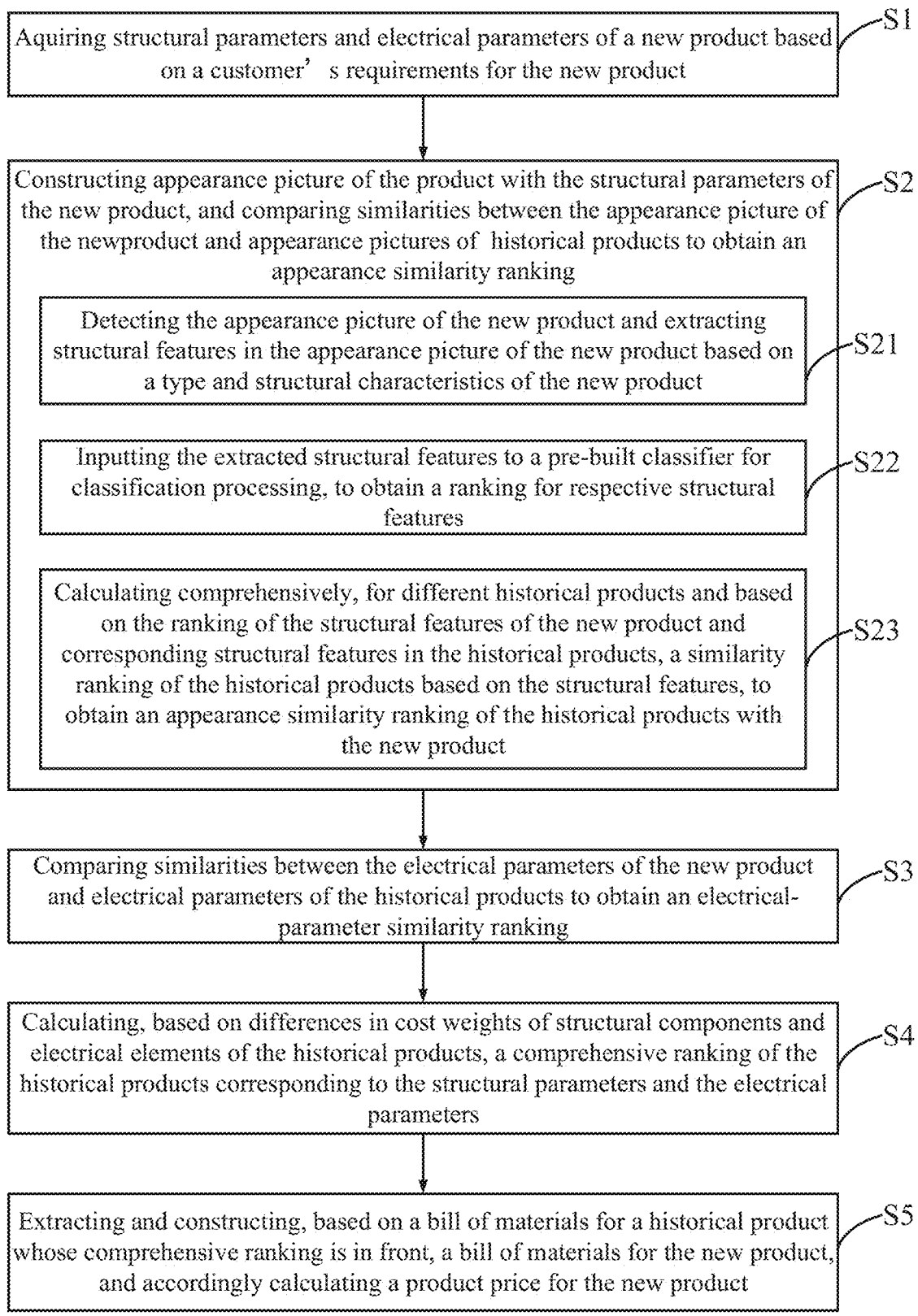
FIG. 1B is a schematic flowchart of an embodiment of a computer-implemented method for determining product price provided by the present disclosure.

FIG. 1B is a schematic flowchart of an embodiment of a method for determining product price provided by the present disclosure. The method for determining product price according to an embodiment of the present disclosure will be described in detail below with reference to FIG. 1B.

As shown in FIG. 1B, first, in step S1, structural parameters and electrical parameters of a product are obtained based on customer's requirements for the product. Next, in step S2, appearance picture of the product is constructed by using the structural parameters of the product, and an appearance similarity ranking is obtained by comparing similarities between the appearance picture of the product and appearance pictures of historical products respectively.

Specifically, the step S2 may include steps S21-S23. As shown in FIG. 1B, in step S21, the appearance picture of the product is detected and structural features in the appearance picture of the product are extracted based on a type and structural characteristics of the product. For example, the detection of the appearance picture may be achieved by using a scanning sub-window, which particularly includes: first, shifting and sliding continuously, with the scanning sub-window, in the appearance picture of the product to be detected; second, calculating, for each position in the appearance picture of the product, the structural features of the location area with the scanning sub-window during the shifting and sliding process. Before the detection of the appearance picture of the product, signal transformation and noise reduction pre-processing may also be performed on the appearance picture of the product. In step S22, the extracted structural features are input to a pre-built classifier for classification process, and a ranking of respective structural features is obtained. In order to achieve a ranking of different historical products, the ranking of the corresponding structural features needs to be obtained. The ranking of respective structural features refers to, for each of the respective structural features, determining a ranking of the historical products and the product with respect to the structural feature. In other words, a ranking for each structural feature may be obtained in step S22.

In the present disclosure, a recursive feature elimination algorithm may be used to calculate the ranking of the structural features. And the calculation includes particularly the following steps:

firstly, converting parameter values corresponding to the structural features into coordinate values to obtain an initial feature permutation R=[ ], where R=[ ] is an permutation formed by feature data; and where R may include multiple subsets of features S={1, 2, . . . , n}, that is, the initial feature permutation includes a polarity of feature categories, and each feature category has a feature subset;

calculating a weight corresponding to each structural feature by $$w = \sum_{i=1}^{m} \alpha_i y_i x_i;$$

where w is a weight corresponding to a structural feature; m is a total number of historical products having the structural feature; $\alpha_i$ is a weight ratio; and $(x_i, y_i)$ is a coordinate value used to represent the structural feature of the picture, for example, to represent a feature the picture, it should be noted that, the manner for converting the parameter values corresponding to the structural features into coordinate values may be any currently feasible conversion scheme, which is not specifically limited by this embodiment;

calculating a permutation score corresponding to each structural feature based on the weight corresponding to each structural feature by: $c_j=(w_j)^2$, where $w_j$ is a weight of the j-th structural feature; $c_j$ is a permutation score corresponding to the j-th structural feature;

removing a feature with the smallest permutation score in the initial feature permutation R=[ ], and performing an updating to obtain a new feature permutation, wherein, a specific update algorithm may employ the following formulas: e=arg min (c); R=[e, R]; S=S−[e]; that is, a ranking of importance of the structure features may be obtained reversely by excluding one structure feature with the lowest permutation score at a time;

repeating the loop of the above steps until only one feature is included in the new feature permutation, i.e., there is only one feature left in the feature permutation, and the ranking of the structural features is accordingly acquired based on an order of features being removed.

Figure 4:
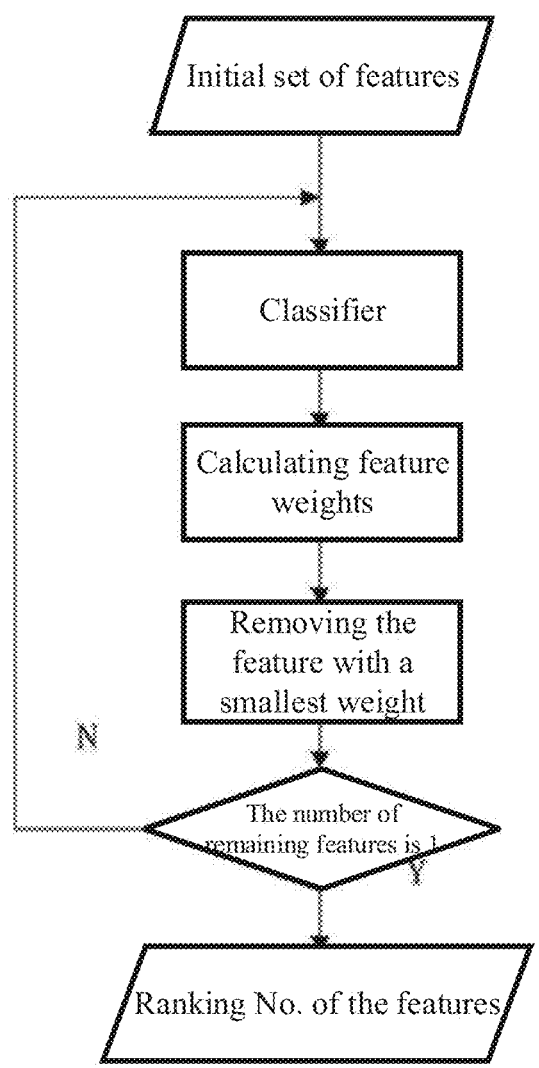
FIG. 4 is a schematic diagram of calculating a ranking of features provided by the present disclosure.

FIG. 4 is a schematic diagram of a principle for calculating the ranking of the structural features provided by the present disclosure.

It should be noted that the feature selection algorithm used in the above embodiments of the present application is a recursive feature elimination algorithm based on a Support Vector Machine (SVM-RFE).

SVM-RFE is based on a 2-norm SVM, and its mathematical model is:

$$\text{Min} \frac{1}{2} \|w\|_2^2 + C \sum_{i=1}^{m} \xi_i$$

$$\text{s.t.} \quad y_i(w \cdot x_i + b) \geq 1 - \xi_i, i = 1, 2, \ldots, m$$

$$\xi_i \geq 0, i = 1, 2, \ldots, m.$$

Wherein, $(x_i, y_i)$ is a coordinate point in space to represent a structural feature; C is a constant; $\xi_i$ is an error; $y_i(w^*x_i+b)$ is a function interval used to realize decision of constraint conditions. w is a parameter weight vector corresponding to the structural feature. It can be seen that, by deformation, a process of solving the quadratic programming problem described by the above formulas is to solve a convex optimization problem. The weight vector of the feature w may be obtained by calculating this quadratic programming problem, and data needs to be brought in for recalculation each time a structural feature is removed. In each iteration, removal of a feature is based on a SVM permutation criterion, and the j-th feature with the smallest permutation score $c_j=(w_j)^2$ will be removed, in which $w_j$ is a weight corresponding to the j-th feature calculated by the SVM.

Herein, the reason for choosing $c_j=(w_j)^2$ as the permutation criterion is that features removed by this criterion will have the least impact on an objective function. The objective function in SVM-RFE is $$J = \frac{1}{2} \|w\|_2^2.$$

By expanding the second-order Taylor series of the objective function, variations caused by the removal of features to the objective function may be estimated as:

$$\Delta J(j) = \frac{\partial J}{\partial w_j}\Delta w_j + \frac{\partial^2 J}{\partial w_j^2}(\Delta w_j)^2$$

The first derivative may be negligible. Substituting $$J = \frac{1}{2}\|w\|_2^2,$$

and the above equation becomes:

$$\Delta J(j) = (\Delta w_j)^2$$

Therefore, the loop process is executed until only one feature left in the feature set, and as a result, a list of sequence numbers of the structural features ranked according to importance of the features is obtained. It can be seen that, the SVM-RFE algorithm is a backward searching algorithm. During the entire loop process, according to ranking scores of the structural features, redundant structural features are firstly removed, and then a new set of ranking scores are iteratively calculated again, until a subset constituted by structural features that have the greatest influence on classification results is left, thereby achieving a purpose of reducing dimension of the structural features and improving classification accuracy.

As shown in FIG. 1B, in step S23, for different historical products, a similarity ranking of the historical products based on the structural features is comprehensively calculated based on the ranking of the structural features of the product and corresponding structural features in the historical products to obtain an appearance similarity ranking of the historical products with respect to the product.

According to an embodiment of the present disclosure, the step of calculating the similarity ranking of the historical products based on the structural features may further includes: for each historical product, respectively extracting structural features of the current historical product and a corresponding ranking from the ranking of the structural features of the historical product; respectively calculating similarities between the current historical product and the product from the structural features extracted from the historical product and the ranking; obtaining a comprehensive ranking of historical products relative to the structural features of the product, that is, an appearance similarity ranking of all historical products with the current product, from the ranking of the structural features of historical products and the structural features of the current product.

According to an embodiment of the present disclosure, similarities between the structural features in the appearance pictures of the historical products and the structural features in the appearance picture of the product may be ranked, with a classifier, based on the recursive feature elimination algorithm.

Figure 3:
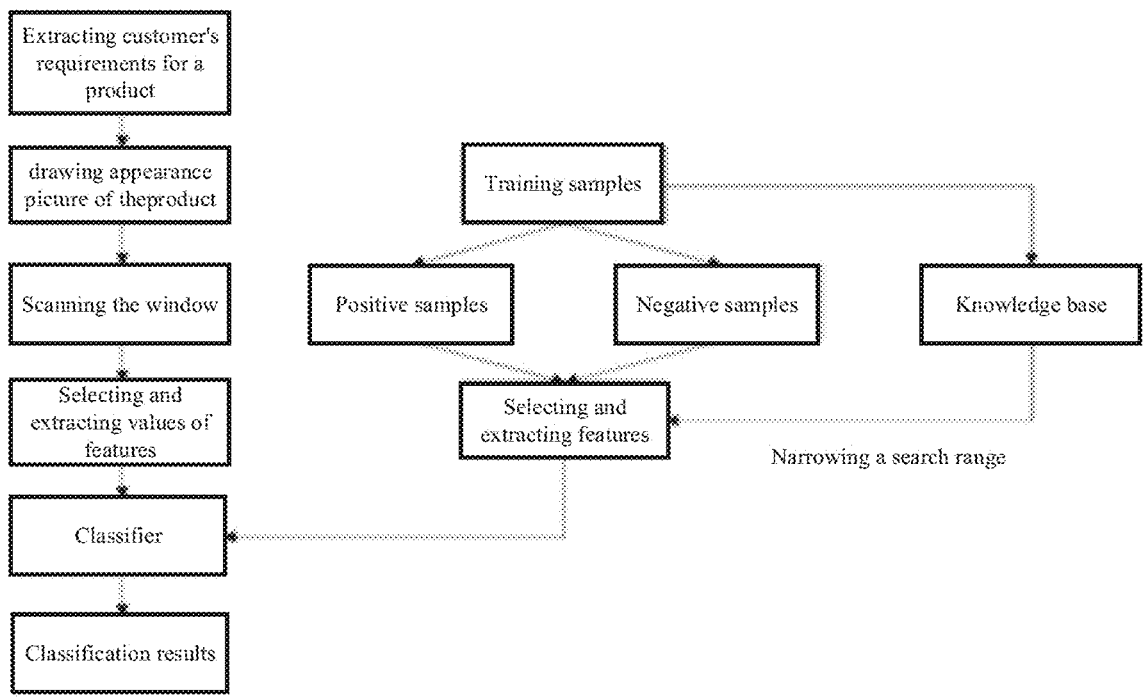
FIG. 3 is a schematic diagram of feature extraction and classifier training provided by the present disclosure.

FIG. 3 is a schematic diagram of feature extraction and classifier training provided by the present disclosure. It can be known from FIG. 3 that the classifier needs to be trained before classification is implemented with the classifier, as described above. Training sample data of the classifier includes positive samples and negative samples, where the positive samples are samples containing a target to be detected and the negative samples are samples containing no target to be detected. Furthermore, the classifier may also be trained based on a knowledge base or restrictive conditions. Due to a large amount of data in the sample data, the amount of data of extracted features is also very large, so a knowledge base (for example, for rules) may be added or restrictive conditions may be introduced to narrow a search range in order to shorten the process of training for the classifier. For example, by means of the knowledge base, it is possible to determine that there is a high probability that a certain position of a TV picture represents a button, such that the search range may be significantly narrowed.

As shown in FIG. 1B, in step S3, similarities between the electrical parameters of the product and electrical parameters of the historical products are compared to obtain an electrical-parameter similarity ranking. Next, in step S4, based on differences in cost weights of structural components and electrical elements of the historical products, a comprehensive ranking of the historical products with respect to the structural parameters and the electrical parameters is calculated from the appearance similarity ranking and the electrical-parameter similarity ranking.

In step S5, based on a bill of materials for a historical product whose comprehensive ranking is in front, a bill of materials for the product is determined and constructed, and accordingly a price for the product is calculated. In some optional embodiments of the present application, the step of determining the bill of materials for the product further includes: adjusting and correcting the bill of materials for the product based on the structural parameters and the electrical parameters of the product, to enable the bill of materials for the product to satisfy the structural parameters and the electrical parameters of the product. That is, if the obtained bill of materials for the product still cannot fully satisfy all the parameter requirements of the product, accordingly, a certain degree of modification, addition or deletion to the bill of materials is required to enable parts in the bill of materials to fully satisfy the product's requirements for the structural parameters and the electrical parameters.

Furthermore, the price for the product is calculated by the following formula: product price=Σ(cost of parts)×processing rate×other rates. The prices of raw materials, processing expenses and other expenses need to be considered comprehensively when the product price is calculated. Among them, the cost of parts is mainly the prices of raw materials, and particularly includes: specifications of raw materials, prices of raw materials, net weights of products, glue ports, and losses. In the computer-implemented method for determining product price described in the present application, the appearance picture of the product is constructed from the product's structural parameters, and then the appearance similarity ranking may be obtained by comparing (such as, with the classifier) the appearance picture of the product with the appearance pictures of the historical products, while the electrical-parameter similarity ranking of the historical products is obtained by comparing the electrical parameters, and then the comprehensive ranking based on the structural parameters and the electrical parameters of the historical products is obtained by comprehensively analyzing the two rankings, such that a historical product that is similar to the product may be directly extracted by way of ranking, thereby facilitating a subsequent calculation of the product price by using the bill of materials for the extracted historical product. At the same time, the above-described ranking obtained by comparison of specific parameters will be more accurate and more computational efficiency, and has better accuracy and rate than manual selection. Therefore, the method disclosed in the present disclosure can not only implement determine product price quickly and accurately, but also significantly reduce dependence of product price on research and design engineers, thereby further reduce labor and material costs for determining product price.

Figure 2:
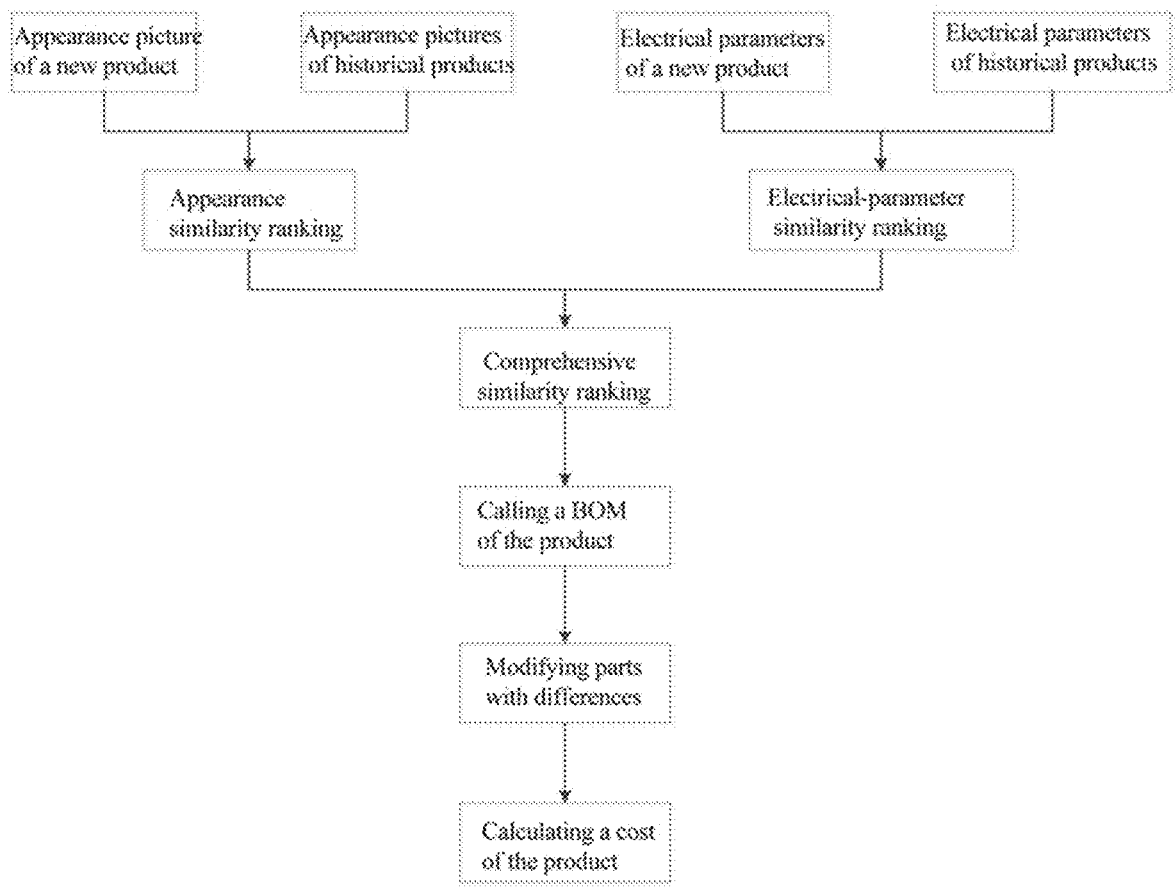
FIG. 2 is a schematic block diagram of a computer-implemented method for determining product price provided by the present disclosure.

FIG. 2 is a schematic block diagram of a computer-implemented method for determining product price provided by the present disclosure. As can be seen from FIG. 2, the method for determining product price according to the present disclosure may include two main sections. One section of the two main sections is to obtain an appearance similarity ranking by comparing appearance picture of a product with appearance pictures of historical products respectively using an image recognition technology. For example, the image recognition technology may be used to compare the appearance pictures of the historical products with the appearance picture of the product respectively. The second section of the two main sections is to obtain an electrical-parameter similarity ranking by comparing electrical parameters of the historical products and electrical parameters of the product, and to obtain a comprehensive similarity ranking of the historical products based on the appearance similarity ranking and the electrical-parameter similarity ranking. Next, a historical product with the highest ranking in the comprehensive similarity ranking is selected, and its BOM and corresponding price information are called as the product's bill of materials. Finally, costs of respective parts in the BOM for the product are calculated according to the formula to obtain an estimated price for the product required by the customer.

Problems solved by the method for determining product price provided in present disclosure include: (1) a problem of current unscientific and inaccurate product price may be solved; (2) barriers of departments between sales and R&D may be broken to reduce communication time, and similar products may be quickly queried as a price reference; (3) accurate product prices may be obtained through scientific calculation methods; (4) helping enterprises achieve successful bidding as soon as possible while obtaining the maximum profit; (5) reducing workload of artificially querying price information of historical products.

With the method, the apparatus for determining product price and the electronic device provided in the present disclosure, the appearance picture of the product is constructed from the product's structural parameters, and then the appearance similarity ranking may be obtained by comparing similarities between the appearance picture of the product with the appearance pictures of the historical products, while the electrical-parameter similarity ranking of the historical products is obtained by comparing the electrical parameters, and then the comprehensive ranking of the historical products is obtained by comprehensively analyzing the two rankings (i.e. the appearance similarity ranking and electrical-parameter similarity ranking), such that a historical product that is similar to the product is extracted in order to calculate a price for the product by using the bill of materials for the extracted historical product. The above-described ranking obtained by comparison of specific parameters will be more accurate and more computational efficiency, and has higher accuracy and faster rate than manual comparison. Therefore, the present application can not only implement determine the product price quickly and accurately, but also significantly reduce dependence of product price on R&D engineers, thereby further reducing labor and material costs for determining the product price.

Figure 5:
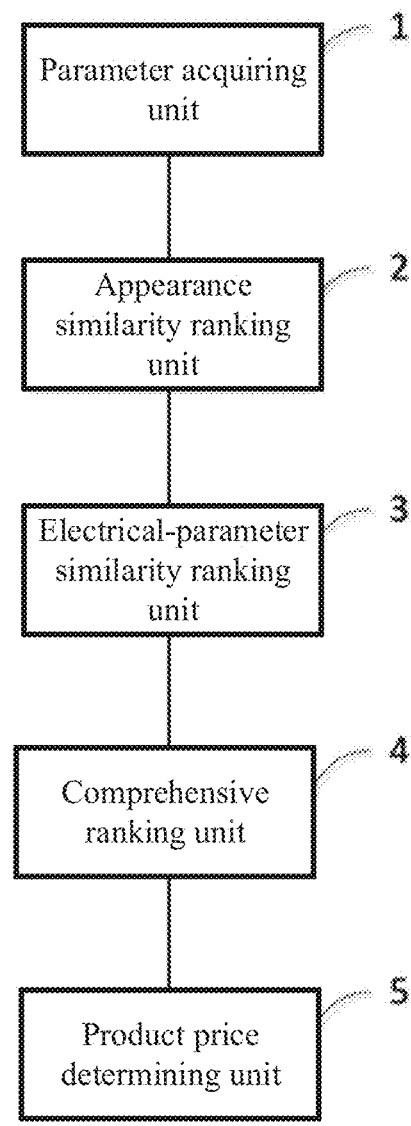
FIG. 5 is a schematic structural block diagram of an apparatus for determining product price provided by the present disclosure.

FIG. 5 is a schematic structural block diagram of an apparatus for determining product price provided by the present disclosure. The product apparatus for determining product price includes a parameter acquiring unit 1, an appearance similarity ranking unit 2, an electrical-parameter similarity ranking unit 3, a comprehensive ranking unit 4, and a product price determining unit 5.

The parameter acquiring unit 1 may be configured to acquire structural parameters and electrical parameters of a product. And the parameter acquiring unit 1 may be further configured to send the acquired structural parameters and electrical parameters to the appearance similarity ranking unit 2 and the electrical-parameter similarity ranking unit 3.

The appearance similarity ranking unit 2 may be configured to construct appearance picture of the product by using the structural parameters of the product, and compare similarities between the appearance picture of the product and appearance pictures of historical products to obtain an appearance similarity ranking.

The electrical-parameter similarity ranking unit 3 may be configured to compare similarities between the electrical parameters of the product and electrical parameters of the historical products to obtain an electrical-parameter similarity ranking.

The comprehensive ranking unit 4 may be configured to obtain a comprehensive ranking with respect to the structural parameters and the electrical parameters based on cost weights of structural components and electrical elements, the appearance similarity ranking, and the electrical-parameter similarity ranking.

The product price determining unit 5 may be configured to determine a bill of materials for the product based on the comprehensive ranking, and calculate a price for the product based on the bill of materials for the product.

The product apparatus for determining product price according to the present disclosure may compare existing historical products based on the structural parameters and the electrical parameters of the product to obtain a bill of materials for a historical product with a high comprehensive similarity ranking as a bill of materials for the product, to calculate a new price for the product. In addition, some parts of the bill of materials for the historical product may be adjusted, and the adjusted bill of materials is taken as the bill of materials for the product to increase accuracy of the price.

In an embodiment according to the present disclosure, the calculated price for the product may be sent to a market department, to achieve a quick estimation of the price, reduce difficulty and workload of communication between a sales side and a R&D side, and further, allow customers to quickly obtain product price, thus to speed up order negotiation.

Figure 6:
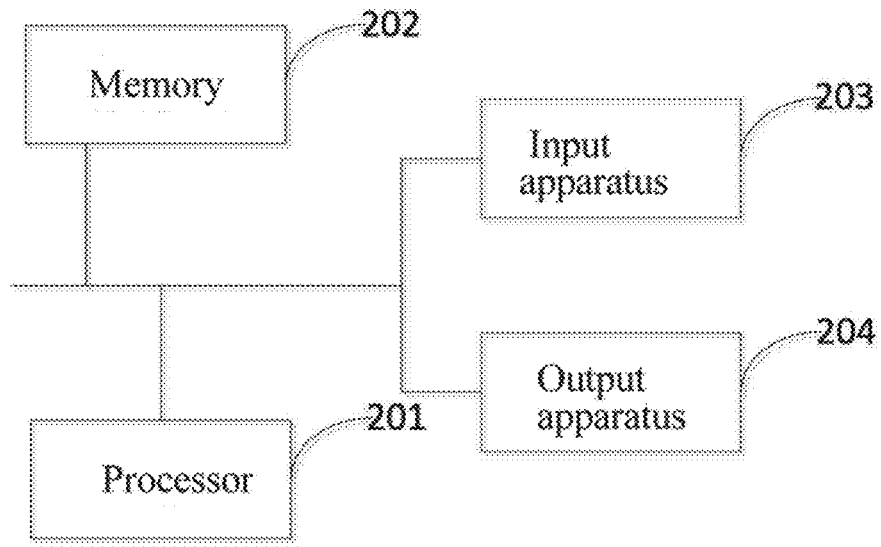
FIG. 6 is a schematic diagram of a hardware structure of a device performing a method for determining product price provided by the present disclosure.

FIG. 6 is a schematic diagram of a hardware structure of an electronic device performing the method for determining product price provided by the present disclosure. The electronic device includes: at least one processor 201 and a memory 202. FIG. 6 illustrates one processor 201 as an example. The memory 202 stores instructions executable by the at least one processor, which enable the at least one processor to execute the method for determining product price as described above.

The electronic device executing the method for determining product price may further include an input apparatus 203 and an output apparatus 204. The processor 201, the memory 202, the input apparatus 203, and the output apparatus 204 may be connected via a bus or other manners. In FIG. 6, connection via a bus is taken as an example.

The memory 202, as a non-volatile computer-readable storage medium, may be used to store non-volatile software programs, non-volatile computer executable programs, and modules, such as program instructions/modules corresponding to the method for determining product price in the embodiments of the present application. The processor 201 executes various functional applications and data processing of a server, that is, implements the method of the foregoing method embodiments, by running non-volatile software programs, instructions, and modules stored in the memory 202.

The memory 202 may include a storage program area and a storage data area, where the storage program area may store an operating system and at least one application program required for functions; and the storage data area may store data created according to the use of the apparatus for determining product price and the like. By way of an example instead of a limitation, the memory may include a read-only memory (ROM), a random-access memory (RAM), or other optical disk storages and magnetic disk storages, or other magnetic storage devices, or any storage medium can be used to carry or store instructions or expected program codes in form of data structures and can be accessed by a computer. In addition, the memory 202 may include a high-speed random access memory, and may further include a non-volatile memory, such as at least one magnetic disk storage device, a flash memory device, or other non-volatile solid-state storage devices. In some embodiments, the memory 202 may optionally include memories remotely disposed with respect to the processor 201, and these remote memories may be connected to the apparatus for determining product price through a network. Examples of the above network include, but are not limited to, the Internet, an intranet, a local area network, a mobile communication network, and combinations thereof.

The input apparatus 203 may receive inputted numeric or character information, and generate key signal inputs related to user settings and function control of the apparatus for determining product price. The output apparatus 204 may include a display device, such as a display screen.

The one or more modules are stored in the memory 202, which when executed by the one or more processors 201, perform the method for determining product price in the foregoing embodiments.

The electronic device in the embodiment of the present disclosure may exist in various forms, including but not limited to:

(1) Mobile communication equipment: this kind of equipment is characterized by mobile communication functions, and its main goal is to provide voice and data communication. This kind of terminals include: smart phones (e.g., iPhone), multimedia phones, functional phones, and low-end phones.

(2) Ultra-mobile personal computer equipment: this kind of equipment belongs to a category of personal computers, has computing and processing functions, and generally has characteristics of mobile Internet access. This kind of terminals include: PDA, MID and UMPC devices, such as an iPad.

(3) Portable entertainment equipment: this kind of equipment can display and play multimedia content. This kind of equipment includes: audio and video players (e.g., iPods), handheld game consoles, e-books, as well as smart toys and portable vehicle navigation devices.

(4) Server: a device providing computing services. Constitution of the server includes processors, hard disks, memories, and system buses. The server is similar to a general-purpose computer architecture but has higher requirements in terms of processing capability, reliability, security, scalability, manageability, etc. due to a need for providing highly reliable services.

(5) Other electronic apparatuses with data interaction functions.

Figure 7:
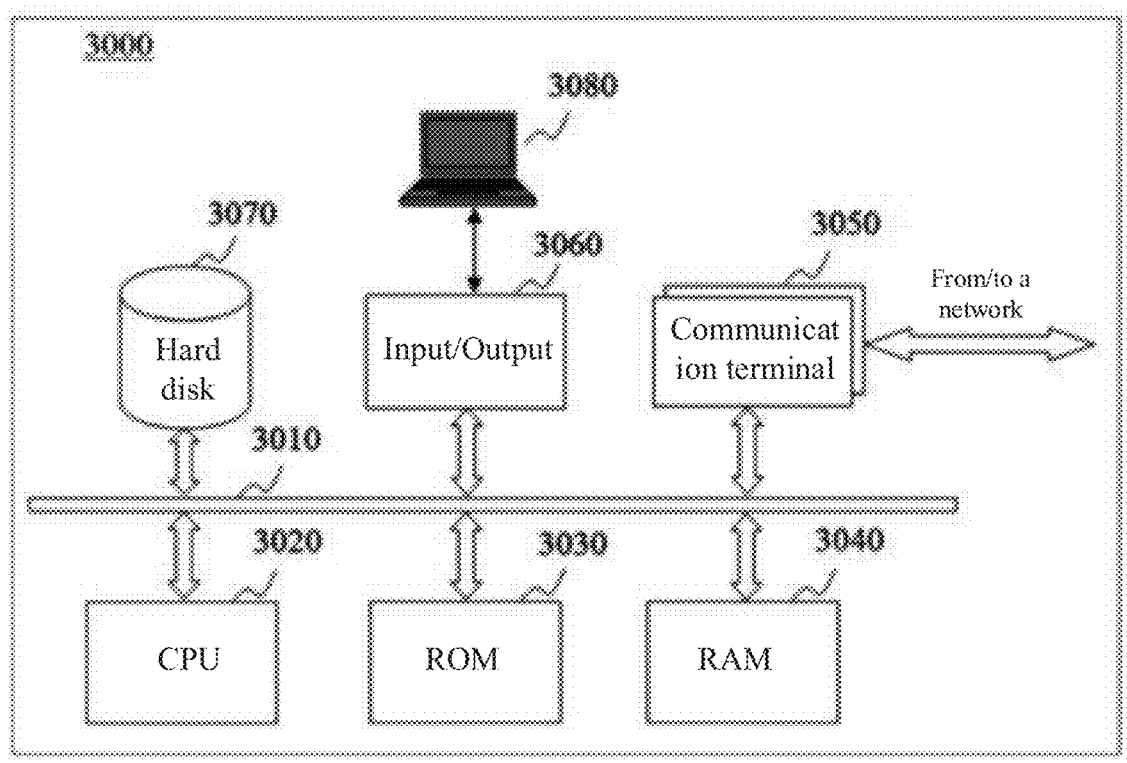
FIG. 7 illustrates a schematic diagram of an architecture of an exemplary computing device according to an embodiment of the present disclosure.

The method or apparatus according to the embodiments of the present disclosure may also be implemented by means of an architecture of a computing device 3000 shown in FIG. 7. As shown in FIG. 7, the computing device 3000 may include a bus 3010, one or more CPUs 3020, a read only memory (ROM) 3030, a random access memory (RAM) 3040, a communication port 3050 connected to a network, an input/output component 3060, and a hard disk 3070, etc. Storage devices in the computing device 3000, such as the ROM 3030 or the hard disk 3070, may store various data or files used for processing and/or communications of the method for determining product price provided by the present disclosure and program instructions executed by the CPUs. The computing device 3000 may further include a user interface 3080. Certainly, the architecture shown in FIG. 7 is only exemplary, and one or more components of the computing device shown in FIG. 7 may be omitted according to actual needs when implementing different devices. According to an embodiment of the present disclosure, there is also provided a computer-readable storage medium having stored thereon instructions that, when executed by a processor, cause the processor to execute the method for determining product price as described above.

Figure 8:
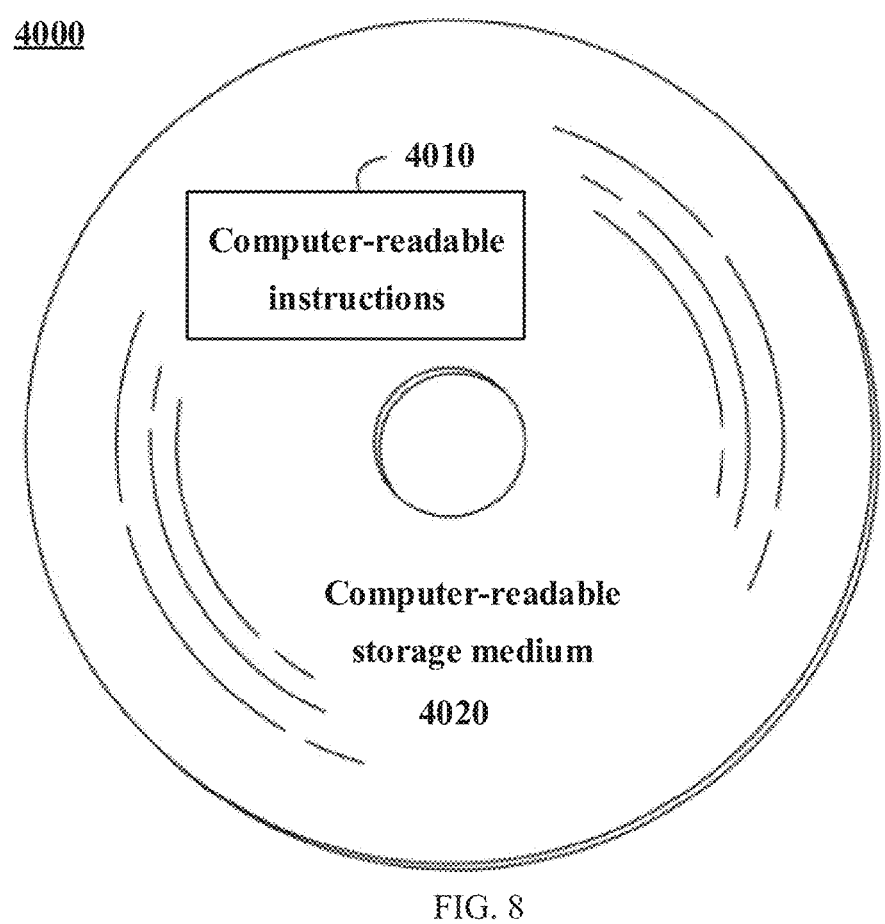
FIG. 8 shows a schematic diagram of a storage medium according to an embodiment of the present disclosure.

FIG. 8 shows a schematic diagram 4000 of a storage medium according to the present disclosure. As shown in FIG. 8, the computer storage medium 4020 stores computer-readable instructions 4010. When the computer-readable instructions 4010 are executed by a processor, the method for determining product price according to the embodiments of the present disclosure described with reference to the above drawings may be executed. The computer-readable storage medium includes, but is not limited to, volatile memory and/or non-volatile memory, for example. The volatile memory may include, for example, a random access memory (RAM) and/or a cache memory. The non-volatile memory may include, for example, a read-only memory (ROM), a hard disk, a flash memory, and the like.

Those of ordinary skill in the art should understand that, discussions of any of the above embodiments is merely exemplary, and is not intended to imply that the scope of the disclosure (including the claims) is limited to these examples; in light of the present disclosure, the above embodiments or technical features in different embodiments may also be combined, steps may be implemented in any order, and there are many other variations of different aspects of the present disclosure as described above, which are not provided in detail for sake of brevity.

In addition, to simplify the description and the discussions, and so as not to make the present disclosure difficult to understand, well-known power/ground connections to integrated circuit (IC) chips and other components may or may not be shown in the drawings provided. Furthermore, the apparatuses may be shown in block diagram form in order to avoid making the present disclosure difficult to understand, and this also takes into account the fact that details regarding implementations of these block apparatuses are highly dependent on a platform on which the present disclosure to be implemented (i.e. these details should be completely within the understanding of those skilled in the art). Where specific details (e.g., circuits) are set forth to describe exemplary embodiments of the present disclosure, it will be apparent to those skilled in the art that the present disclosure may be implemented without these specific details or in case that these specific details have changed. Therefore, these descriptions should be considered as illustrative instead of limitative.

Although the present disclosure has been described in connection with specific embodiments of the present disclosure, many substitutions, modifications and variations of these embodiments will be apparent to those skilled in the art according to the foregoing description. For example, other memory architectures (e.g., a dynamic RAM (DRAM)) may use the embodiments as discussed.

The embodiments of the present disclosure are intended to cover all such alternatives, modifications and variations that fall within the broad scope of the appended claims. Therefore, any omissions, modifications, equivalent replacements improvements, etc. made within the spirit and principles of the present disclosure should be included in the scope of the present disclosure.

This application claims priority of Chinese Patent Application No. 201810731140.4, filed on Jul. 5, 2018, the entirety of which is incorporated herein by reference as a part of this application.

What is claimed is:

1. A computer-implemented method for determining product price, comprising:
   acquiring structural parameters and electrical parameters of a product;
   constructing, by using a drawing software installed in the computer, appearance picture of the product with the structural parameters of the product, wherein the appearance picture comprises shape, size, material and appearance design parameters of the product, and the appearance picture is a six-views picture of the product drawn at a same scale or a three-dimensional stereoscopic structure diagram;
   performing signal transformation and noise reduction pre-processing on the appearance picture of the product;
   detecting the appearance picture of the product to extract structural features in the appearance picture of the product;
   ranking, with a classifier, similarities between the structural features in the appearance pictures of the historical products obtained from a database accessible to the computer and the structural features in the appearance picture of the product based on a recursive feature elimination algorithm;
   comparing similarities between the electrical parameters of the product and electrical parameters of the historical products to obtain an electrical-parameter similarity ranking;
   obtaining a comprehensive ranking with respect to the structural parameters and the electrical parameters based on cost weights of structural components and electrical elements, the appearance similarity ranking and the electrical-parameter similarity ranking; and
   determining a bill of materials for the product based on the comprehensive ranking, and calculating a price for the product based on the bill of materials for the product.

2. The method according to claim 1, further comprising:
   performing signal transformation and noise reduction pre-processing on the appearance picture of the product.

3. The method according to claim 1, wherein the detecting the appearance picture of the product comprises:
   moving a scanning sub-window in the appearance picture of the product;
   calculating, for each position in the appearance picture of the product determined during the movement of the scanning sub-window, structural features of the position.

4. The method according to claim 1, wherein the ranking the similarities between the structural features in the appearance pictures of the historical products and the structural features in the appearance picture of the product based on a recursive feature elimination algorithm comprises:
   converting parameter values corresponding to the structural features into coordinate values to obtain an initial feature permutation;

$$w = \sum_{i=1}^{m} \alpha_i y_i x_i,$$

calculating a weight corresponding to each structural feature by wherein w is a weight corresponding to a structural feature, m is a total number of historical products having the structural feature, $\alpha_i$ is a weight ratio, and $(x_i, y_i)$ is a coordinate value used to represent the structural feature of the picture;
   calculating an permutation score corresponding to each structural feature based on the weight corresponding to each structural feature by $c_j=(w_j)^2$, wherein $w_j$ is a weight corresponding to the j-th structural feature, and $c_j$ is a permutation score corresponding to the j-th structural feature;
   removing a feature with the smallest permutation score in the initial feature permutation, and updating the initial feature permutation to obtain a new feature permutation;
   repeating a loop of above steps until only one feature is included in the new feature permutation, and obtaining a similarity ranking of the structural features based on an order of features being removed.

5. The method according to claim 1, further comprising training the classifier based on a knowledge base or restrictive conditions by using training sample data, wherein the training sample data includes positive samples and negative samples, the positive samples are samples containing structural features to be detected, and the negative samples are samples containing no structural features to be detected.

6. The method according to claim 1, wherein the comparing similarities between the electrical parameters of the product and electrical parameters of the historical products to obtain an electrical-parameter similarity ranking includes:
   determining numbers of same electrical parameters that the historical products have as the product;
   ranking the historical products based on the numbers of the same electrical parameters.

7. The method according to claim 1, wherein the obtaining a comprehensive ranking with respect to the structural parameters and the electrical parameters based on cost weights of structural components and electrical elements, the appearance similarity ranking and the electrical-parameter similarity ranking comprises:
   determining weights of the appearance similarity ranking and the electrical-parameter similarity ranking based on cost weights of the structural components and the electrical elements;
   calculating the comprehensive ranking with respect to the structural parameters and the electrical parameters based on the weights of the appearance similarity ranking and the electrical-parameter similarity ranking.

8. The method according to claim 1, wherein the determining a bill of materials for the product further comprises:
   adjusting the bill of materials for the product based on the structural parameters and the electrical parameters of the product, to obtain a bill of materials for the product satisfying the structural parameters and the electrical parameters of the product.

9. The method according to claim 1, wherein the price for the product is calculated by the following formula:

Product price=Σ(cost of parts)×processing rate×other rates wherein the cost of parts is calculated based on the bill of materials for the product, and the processing rate and other rates are obtained from an enterprise resource planning system.

10. An electronic device, comprising:
at least one processor; and
a memory communicatively connected to the at least one processor,
wherein the memory stores instructions executable by the at least one processor, which enable the at least one processor to execute the computer-implemented method for determining product price according to claim 1.

11. A computer-readable storage medium having stored thereon instructions that, when executed by a processor, cause the processor to execute the computer-implemented method for determining product price according to claim 1.

12. An apparatus for determining product price, comprising:
a parameter acquiring unit configured to acquire structural parameters and electrical parameters of a product;
an appearance similarity ranking unit configured to construct, by using a drawing software, appearance picture of the product by using the structural parameters of the product, perform signal transformation and noise reduction pre-processing on the appearance picture of the product; detect the appearance picture of the product to extract structural features in the appearance picture of the product; rank, with a classifier, similarities between the structural features in the appearance pictures of the historical products obtained from an accessible database and the structural features in the appearance picture of the product based on a recursive feature elimination algorithm, wherein the appearance picture comprises shape, size, material and appearance design parameters of the product, and the appearance picture is a six-views picture of the product drawn at a same scale or a three-dimensional stereoscopic structure diagram;
an electrical-parameter similarity ranking unit configured to compare similarities between the electrical parameters of the product and electrical parameters of the historical products to obtain an electrical-parameter similarity ranking;
a comprehensive ranking unit configured to obtain a comprehensive ranking with respect to the structural parameters and the electrical parameters based on cost weights of structural components and electrical elements, the appearance similarity ranking and the electrical-parameter similarity ranking; and
a product price determining unit configured to determine a bill of materials for the product based on the comprehensive ranking, and calculate a price for the product based on the bill of materials for the product.

* * * * *